No. 12,596. REISSUED JAN. 15, 1907.

G. B. MALTBY.

DUMP CAR.

APPLICATION FILED NOV. 7, 1906.

2 SHEETS—SHEET 1.

Witnesses:
Ed. E. Gaylord,
Chas. H. Burr.

Inventor:
George B. Maltby.
By Thomas F. Sheridan,
Atty.

No. 12,596. REISSUED JAN. 15, 1907.

G. B. MALTBY.

DUMP CAR.

APPLICATION FILED NOV. 7, 1906.

2 SHEETS—SHEET 2.

Witnesses:
Chas. E. Taylor.
Chas. H. Buell.

Inventor:
George B. Maltby.
By Thomas F. Sheridan,
Atty.

UNITED STATES PATENT OFFICE.

GEORGE B. MALTBY, OF CLEVELAND OHIO, ASSIGNOR, BY MESNE ASSIGNMENTS, TO NATIONAL DUMP CAR COMPANY, A CORPORATION OF MAINE.

DUMP-CAR.

No. 12,596. Specification of Reissued Letters Patent. Reissued Jan. 15, 1907.

Original No. 739,894, dated September 29, 1903. Application for reissue filed November 7, 1906. Serial No. 342,435.

*To all whom it may concern:*

Be it known that I, GEORGE B. MALTBY, a citizen of the United States, residing at Cleveland, in the county of Cuyahoga and State of Ohio, (formerly of Chicago, Cook county, Illinois,) have invented certain new and useful Improvements in Dump-Cars, of which the following is a specification.

The invention relates to that class of freight-cars which are adapted to the carrying of loose bulky freight—such as broken stone, ballast, and the like—and particularly to the arrangement of the car by which the load may be self-discharged, all of which will more fully hereinafter appear.

The principal object of the invention is to provide a simple, economical, and efficient dump-car with means by which the loose freight therein may be discharged through the bottom and side thereof.

Other objects will appear from an examination of the drawings and the following description and claims.

The invention consists principally in a dump-car in which there are combined a supporting-frame portion, a drop-bottom therefor formed of swinging doors pivoted at their inner edges to the supporting-frame portion and at each side of its longitudinal center, and swinging portions attached to the outer free edges of the drop-bottom doors.

The invention consists, further and finally, in the features, combinations, and details of arrangement hereinafter described and claimed.

Figure 1:
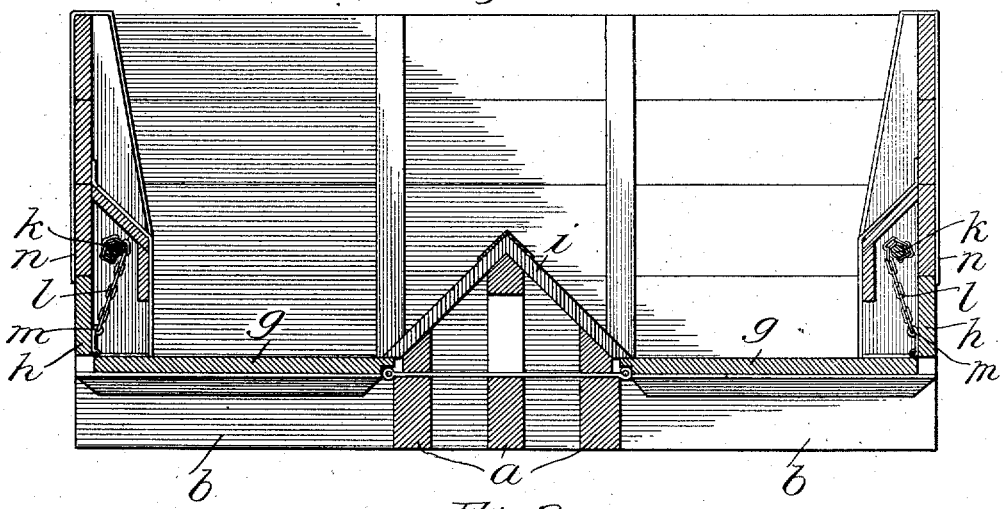
Figure 2:
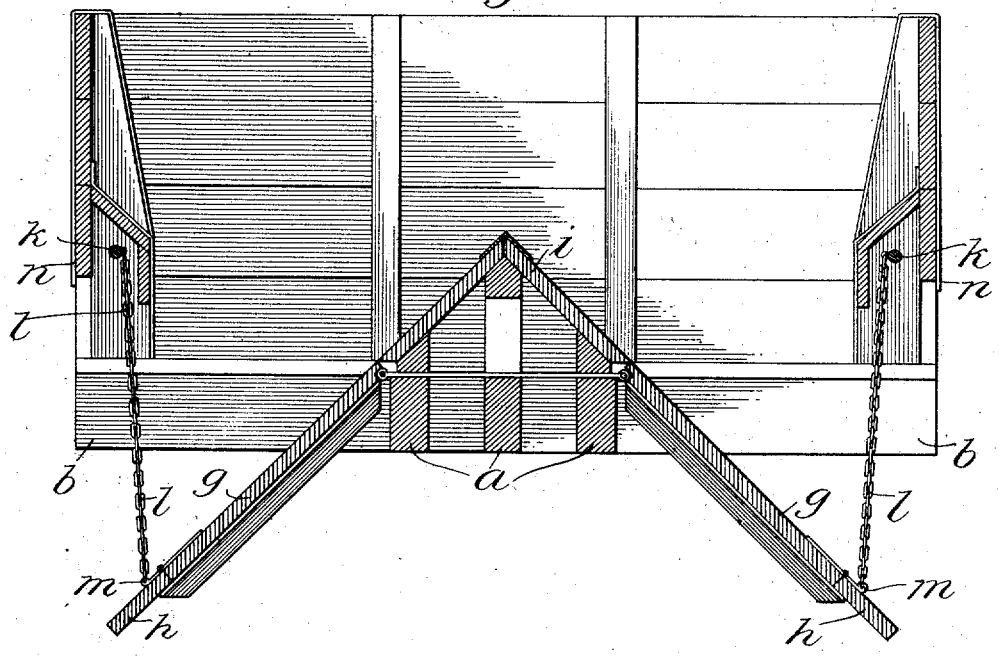
Figure 3:
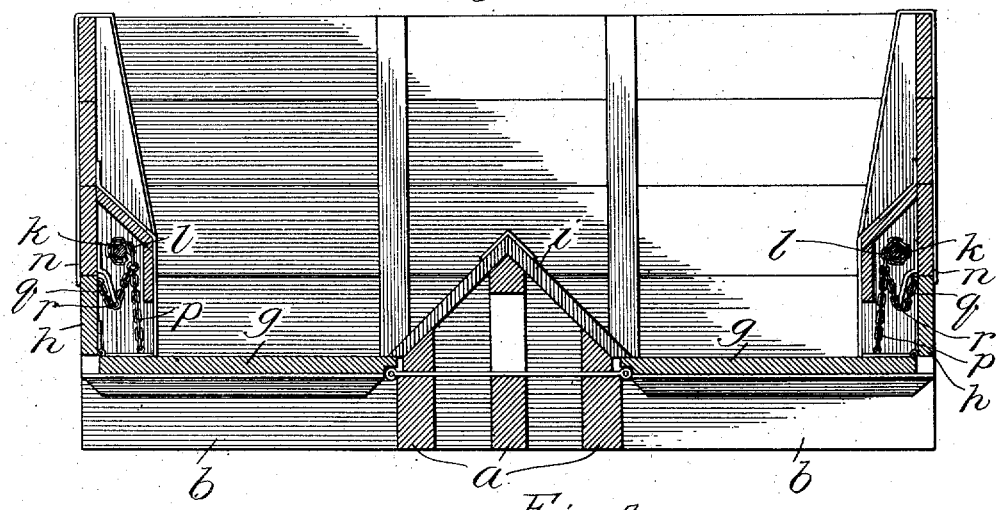

In the accompanying drawings, Figure 1 is a cross-sectional elevation of a car as it appears when constructed in accordance with these improvements, showing the parts in closed position; Fig. 2, a similar view of the car with the parts in open or dumping position; Fig. 3, a similar view of the car and parts as shown in Fig. 1, with a modified form of chain attachments; and Fig. 4, a similar view of the car as shown in Fig. 3, with the parts in dumping position.

In the art to which this invention relates it is well known that it is highly desirable to have a car that will permit the freight therein, such as ballast or coal, to be discharged to each side of the track, and, further, that it is quite desirable to have the parts so arranged that this side discharge may also take place from above and to each side of the car-trucks. To this end this invention is principally designed.

In illustrating and describing these improvements I have only illustrated and will here describe that which I consider to be new, taken in connection with so much as is old as will properly disclose the invention to others and enable those skilled in the art to practice the same, leaving out of consideration other and well-known elements which if set forth herein would only tend to confusion, prolixity, and ambiguity.

In constructing a car in accordance with these improvements I provide a supporting-framework of the desired size, construction, and arrangement to maintain the different parts in position and which preferably has a plurality of center sills *a* and cross-sills or deck-beams *b*. Attached to and supported by the underframe of the car and extending upwardly therefrom is a pair of side boards *c* and end boards *d*, having the usual side stakes *e* and end stakes *f*.

To assist in discharging the load to each side of the car-tracks, I provide a drop-bottom portion formed of a plurality of swinging doors *g*, pivotally secured to the underframing of the car at their inner edges and to each side of the longitudinal center and extending outwardly therefrom. These dumping-doors are provided with swinging end portions *h*, which are so constructed and arranged that when the parts are closed—that is, in one position—they form a part of the side boards of the car and assist in retaining the load in place, and when the parts are open or in a second position they form a continuation or extension of the drop-bottom portion, so as to facilitate the discharge of the load to each side of the track, or, in other words, to throw it out from the body of the car. This particular arrangement is very advantageous in that it permits of the use of a wider central fixed portion, so that the hinging of the swinging doors need not take place so near the center of the car, as is usual, but may be a considerable distance therefrom. Again, this particular arrangement is advantageous when the swinging doors, which form a portion of the drop-bottom of the car, are arranged over the car-trucks.

Arranged in the car above the supporting-framework and in line with the longitudinal center thereof is an apex portion *i*, which assists in discharging the load when the parts are in their open position. To close the doors which form the drop-bottom, rock-shafts or shafts *k* are provided, rotatably mounted in bearings on the side frame of the car and provided with a multiplicity of chains *l*, adapted to be wound therearound and one end of which may be secured to the foldable end sections of the doors, as shown particularly in Fig. 2. The attachment of these chains to the foldable end section of the doors is by means of a hinge *m*, which is secured to both the main body portion of the drop-bottom doors and the foldable ends thereof, so that as the chain is wound around the rock-shaft (see Fig. 1) the doors are brought up into position and the foldable end sections thereof into position, as shown. The side frame of the car or the fixed portion thereof is provided with straps *m*, that extend down to a point slightly below such fixed section and against which the free ends of the foldable end sections of the drop-bottom doors may rest. These straps therefore assist in partially enabling such sections to withstand the outward stress to which they are exposed when carrying loose freight.

Figure 4:
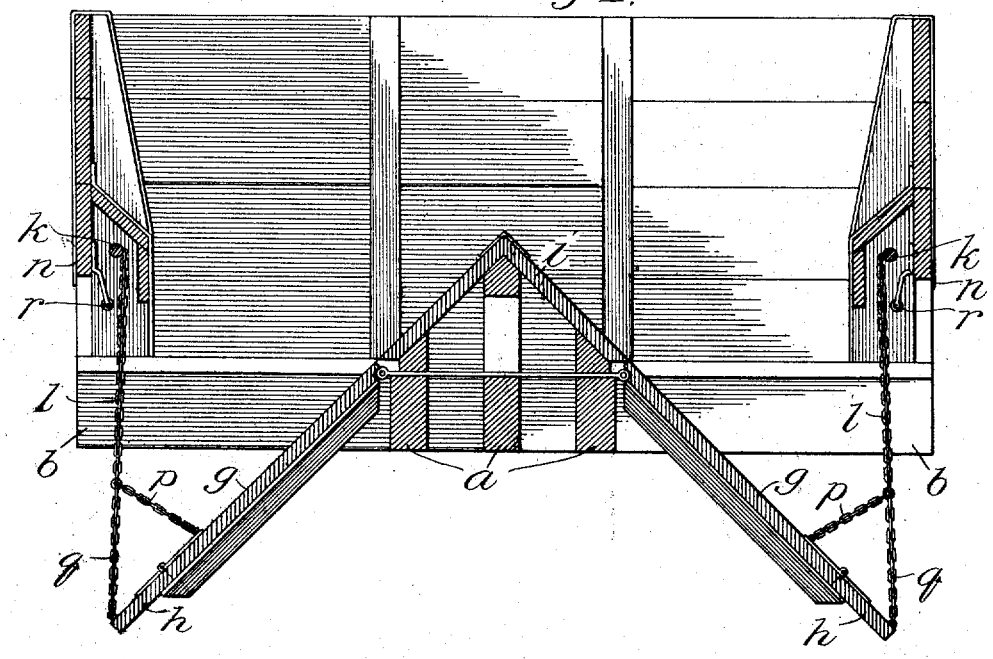

In Figs. 3 and 4 I have shown a modified means of raising the doors which form the drop-bottom portion into closed position, consisting of rock-shafts *k*, as above described, provided with chain mechanism *l*, having two portions *p* and *q* attached thereto and to the main body portion of the swinging doors and foldable end portions thereof, as shown particularly in Fig. 4. When the rock-shaft is being rotated in one direction, so as to wind the chain therearound, and as the parts reach their closed position, the part *q* of the chain strikes a downwardly-extending arm *r* on the inside of the side boards, which assists the chain in throwing the foldable end section of the door into closed position, so as to form a part (the lower) of the side boards of the car. In other respects the car or portions thereof shown in Figs. 3 and 4 are substantially identical with the parts shown and described in connection with Figs. 1 and 2.

I claim—

1. In a car of the class described, the combination of a supporting-frame portion, a drop-bottom therefor formed of swinging doors pivotally secured thereto at their inner edges and at each side of the longitudinal center, and foldable end portions on the free edges of the drop-bottom doors adapted to form a part of the discharging-apron when in open position and a part of the side boards of the car when in closed position, substantially as described.

2. In a dump-car of the class described, the combination of a supporting-frame, a drop-bottom portion therefor formed of a plurality of swinging doors pivotally secured thereto at their inner edges and provided with outer foldable sections adapted to form a part of the discharging-apron when in open position and a part of the side boards of the car when in closed position, and chain mechanism secured to such foldable portions of the drop-bottom doors to bring the same to closed position, substantially as described.

3. In a dump-car of the class described, the combination of a supporting-framework, a drop-bottom portion therefor formed of a plurality of swinging doors pivotally secured thereto at their inner edges, foldable sections pivotally secured to the outer free edges of the drop-bottom doors and forming a discharging-apron in connection therewith when the parts are in open position and the lower part of the side boards of the car when the parts are in their closed position, rock-shaft mechanism rotatably mounted in the framework of the car, and chain mechanism secured to such rock-shaft mechanism and to the drop-bottom doors and foldable sections thereof to bring the parts to closed position, substantially as described.

4. In a car of the class described, the combination of a supporting-frame portion, a drop-bottom therefor formed of swinging doors pivotally secured thereto at their inner edges and at each side of the longitudinal center, and foldable end portions on the free edges of the drop-bottom doors adapted to form a part of the discharging-apron when in open position.

5. In a car of the class described, the combination of a supporting-frame portion, a drop-bottom therefor formed of swinging doors pivotally secured thereto at their inner edges and at each side of the longitudinal center, and end portions hinged to the free edges of the doors to swing into alinement with the doors when the doors are in discharging position.

GEORGE B. MALTBY.

Witnesses:

WM. B. WAGGONER,
W. S. BIDLE.